United States Patent
Nisiyama

(10) Patent No.: US 7,031,829 B2
(45) Date of Patent: Apr. 18, 2006

(54) CAR NAVIGATION SYSTEM PRIORITIZING AUTOMATIC TRAVEL ROAD

(75) Inventor: Seiji Nisiyama, Anjo (JP)

(73) Assignee: Denso Corporation, Kariya (JP)

( * ) Notice: Subject to any disclaimer, the term of this patent is extended or adjusted under 35 U.S.C. 154(b) by 84 days.

(21) Appl. No.: 10/662,284

(22) Filed: Sep. 16, 2003

(65) Prior Publication Data
US 2004/0068366 A1   Apr. 8, 2004

(30) Foreign Application Priority Data
Oct. 7, 2002   (JP) .............................. 2002-293432

(51) Int. Cl.
*G01C 21/00* (2006.01)
(52) U.S. Cl. ...................... 701/209; 701/201; 701/208; 701/207; 340/988; 340/995.19
(58) Field of Classification Search ................... 701/23, 701/25, 201–209; 340/988, 995.19
See application file for complete search history.

(56) References Cited

U.S. PATENT DOCUMENTS

| | | | | |
|---|---|---|---|---|
| 5,878,368 A | * | 3/1999 | DeGraaf | ...................... 701/209 |
| 5,931,888 A | | 8/1999 | Hiyokawa | |
| 5,991,689 A | * | 11/1999 | Aito et al. | ................... 701/209 |
| 6,032,098 A | | 2/2000 | Takahashi et al. | |
| 6,295,503 B1 | * | 9/2001 | Inoue et al. | ................ 701/209 |
| 6,484,092 B1 | * | 11/2002 | Seibel | ........................ 701/209 |

FOREIGN PATENT DOCUMENTS

| | | |
|---|---|---|
| JP | A-9-184738 | 7/1997 |
| JP | A-10-162285 | 6/1998 |

* cited by examiner

*Primary Examiner*—Thomas G. Black
*Assistant Examiner*—Eric M. Gibson
(74) *Attorney, Agent, or Firm*—Posz Law Group, PLC

(57) ABSTRACT

Road map data includes node data indicating a branch point, a junction point, or an intersection point and link data indicating a road between the preceding points. The node data and link data include distances, kinds of the roads, costs based on easiness of traveling. In a route search, a route is selected so that a total cost included in traveling on the route to a destination can be minimum. When command is generated as giving priority to an automatic travel road, costs included in the node and link data that correspond to the automatic travel road are lowered. A route including the automatic travel road is thereby selected in preference to other routes.

8 Claims, 4 Drawing Sheets

CAR NAVIGATION SYSTEM PRIORITIZING AUTOMATIC TRAVEL ROAD

CROSS REFERENCE TO RELATED APPLICATIONS

This application is based on and incorporates herein by reference Japanese Patent Application No. 2002-293432 filed on Oct. 7, 2002.

FIELD OF THE INVENTION

The present invention relates to a car navigation system capable of prioritizing an automatic travel road in a route search.

BACKGROUND OF THE INVENTION

An automatic travel system enabling a vehicle to automatically travel has been developed as a new traffic system. For instance, in JP-A-H10-162285 discloses an automatic travel system. In this system, lane signal transmitters for each lane of an automatic travel road are disposed at given travel distance intervals in a freeway that is for exclusive automobile travel use and constructed as an automatic travel road. By contrast, two receivers that receive signals from the lane signal transmitters is provided in a lower right and lower left sides of a front bumper of the vehicle. The automatic travel system controls the steering, accelerator, and brakes of the vehicle for automatically traveling so that the respective lane signal transmitters on the freeway can be located at a center of the two receivers. Furthermore, a discrimination signal transmitter is disposed in each interchange of the freeway, while a car navigation system is mounted in the vehicle. Here, when a route to a destination is designated, the car navigation system determines whether it is an interchange at which the vehicle should exit from the freeway based on a signal from the discrimination signal transmitter. The car navigation system then notifies the driver of the determination.

In the above automatic travel road, the driver can be relieved of an operating load to a destination since the driver does not need to operate. However, the car navigation system that is disposed in the vehicle remains only a system that notifies the driver of whether it is an interchange where the driver should exit from the freeway.

Here, a car navigation system typically has a function of automatically searching for a route from the present position to a destination when the destination is set. In the above case where the vehicle capable of automatically traveling on the automatic travel road has a car navigation system, the car navigation system could preferentially select the automatic travel road as at least part of a route to the destination. This results in relieving the driver of an operating load or enhancing safe driving.

SUMMARY OF THE INVENTION

It is an object of the present invention to provide a car navigation system that can preferentially select a route including an automatic travel road.

To achieve the above object, a car navigation system is provided with the following. Road map data includes node data indicating a point of a branch point, a junction point, or an intersection point and link data indicating a road between the points. A route between two points is searched for based on the road map data to be notified as a guide route of the two points. Here, it can be commanded that the route be selected as giving priory to an automatic travel road. Therefore, when a plurality of routes between two points exist and the routes include an automatic travel road, a route including the automatic travel road can be preferentially selected. This results in relieving a driver of an operating load by traveling the automatic travel road.

In another aspect of the present invention, link data of each link includes a cost, and a route is selected as having the minimum total of the costs included in the links. Additionally, when an automatic travel road is given priority to, costs of the links corresponding to the automatic travel road are changed to be smaller. This results in reducing a cost of a route including the automatic travel road, which enables the automatic travel road to preferentially be selected.

In yet another aspect of the present invention, it is determined whether a vehicle has an automatic travel guiding device. The reason why is that preferential selection of the automatic travel guiding road becomes useless when the vehicle has no automatic travel guiding device.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
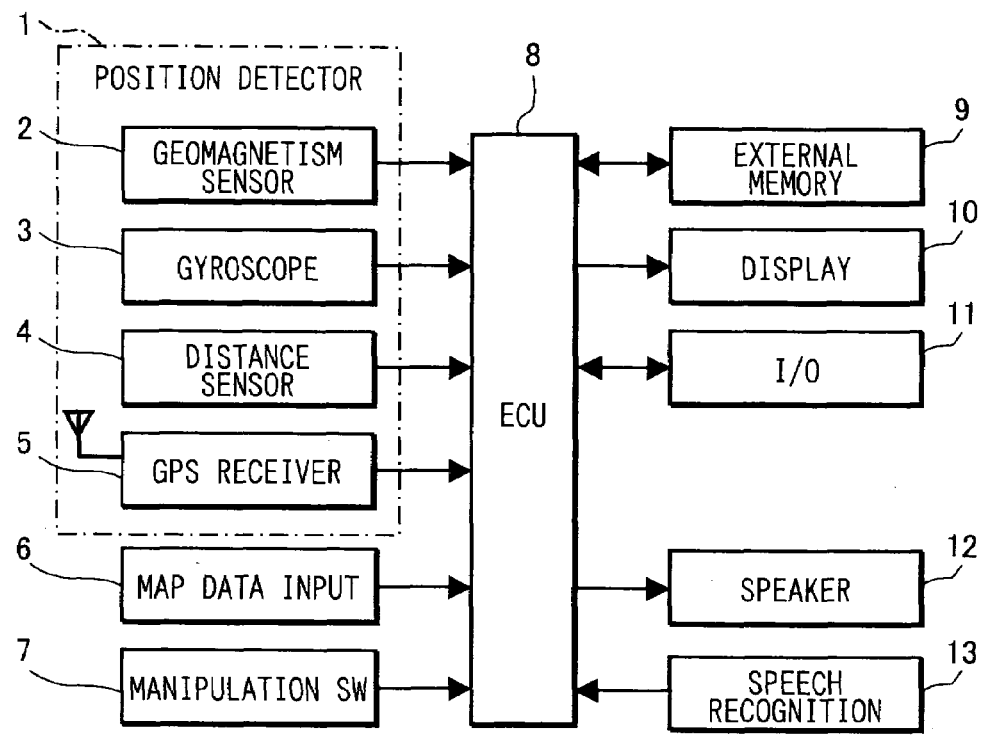
FIG. 1 is a schematic block diagram showing overall structure of a car navigation system according to an embodiment of the present invention.

A car navigation system according to an embodiment of the present invention will be described in connection with drawings. FIG. 1 is a block diagram schematically showing overall structure of a car navigation system. As shown in the figure, the car navigation system includes a position detector 1 further including a geomagnetism sensor 2, a gyroscope 3, a distance sensor 4, a GPS (Global Positioning System) receiver 5, or the like. Furthermore, the car navigation system includes a map data input unit 6, a manipulation switch group 7, and a speech recognition unit 13 having a microphone (not shown). The preceding components and the position detector 1 are connected with a navigation ECU (Electronic Control Unit) 8, so as to input their signals into the navigation ECU 8.

The navigation ECU 8 is also connected with an external memory 9, a display unit 10, an external information I/O unit 11, and a speaker 12 to output signals to the components and input signals from some of the components.

The navigation ECU 8 is constructed as being a common computer having CPU, ROM, RAM, I/O, a bus that is connected with the preceding components. ROM is stored with an executable program for operating the car navigation system. According to the executable program, CPU executes a given computation. Here, the executable program can be obtained from the external information I/O unit 11 or externally obtained through the external memory 9.

The position detector 1 is for detecting a present position of a vehicle. As explained above, it includes the geomagnetism sensor 2, gyroscope 3, distance sensor 4, and GPS receiver 5 that detects the present position of the vehicle based on radio wave from GPS satellites. Each sensor 2 to 5 has a different characteristic and detection accuracy, so that high position detection accuracy is obtained by adjusting the respective errors through combining the sensors 2 to 5. Here, a required accuracy level may properly select some of the sensors 2 to 5 instead of selecting all the sensors 2 to 5. Furthermore, the position detector 1 can include a rotation sensor detecting a steering position, a yaw rate sensor detecting a yaw of the vehicle, or the like.

The map data input unit 6 is for inputting to the navigation ECU 8 map data such as road map data, landmark data, and various retrieving information for setting a destination. The map data input unit 6 includes a map data recoding medium such as DVD-ROM and CD-ROM that are typically used due to a data volume. A memory card or hard disk may be used instead.

Figure 2A:
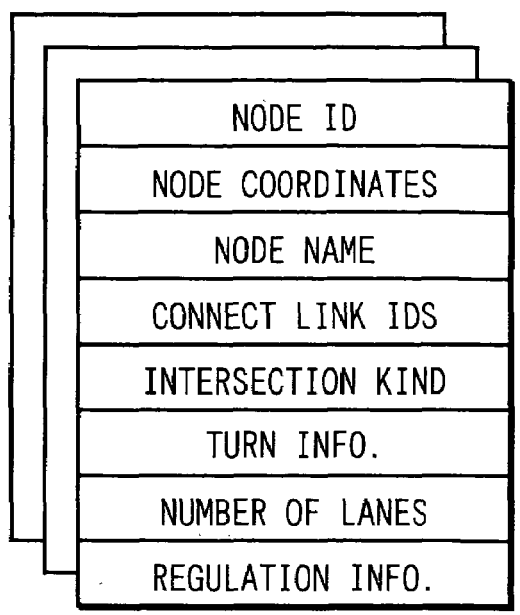
FIG. 2A is a diagram explaining structure of node data.

Here, the road map data will be explained below. The road map data includes node data regarding points of intersections, branch points, and junctions and link data regarding roads between the points. The node data, as shown in FIG. 2A, includes the following: a node ID uniquely assigned to each node; coordinates of the node; a node name; connection link IDs that are all the link IDs connected with the node; an interchange kind; right/left turn dedicated line information; the number of lanes; regulation information; and the like. The link data includes the following; a link ID uniquely assigned to each link; a length of the link; coordinates of starting and terminating points; a road kind such as a highway and local road; a width of the link; a link cost; and the like. The road map data has hierarchical structure, so that nodes and links to be displayed can be changed according to a scale size of the road map to be displayed.

The external memory 9 is stored with a point that is previously registered as a destination and data for executing an additional function of the car navigation system.

The display unit 10 includes an LCD (Liquid Crystal Display) for displaying: an own vehicle mark that is displayed based on the present position detected by the position detector 1; road map data inputted from the map data input unit 6; and additional data such as a guide route overlapped on the map.

The manipulation switch group 7 includes a touch panel switch that is integrated with the display unit 10, or mechanical switches for inputting various items. For instance, when a position of a destination is inputted through the manipulation switch group 7, a guide route is formed by automatically selecting the most proper route to the destination from the present position as a starting point. Route guidance is then performed according to the guide route.

The external information I/O unit 11 is for receiving external information such as VICS (Vehicle Information and Communication System) and for outwardly transmitting information. The externally received information is treated by the navigation ECU 8. When the information is congestion information or regulation information, it is then displayed as being superimposed on the map. If necessary, the information treated by the navigation ECU 8 is outputted from the external information I/O unit 8.

The speaker 12 is used for outputting a voice route guidance to the destination or various alarm sounds. The speaker 12 can be a speaker built in the vehicle or a speaker embedded in the car navigation system.

The speech recognition unit 13 recognizes a user speech that is uttered for operating the car navigation system by voice, and outputs a result of recognition to the navigation ECU 8.

Figure 3:
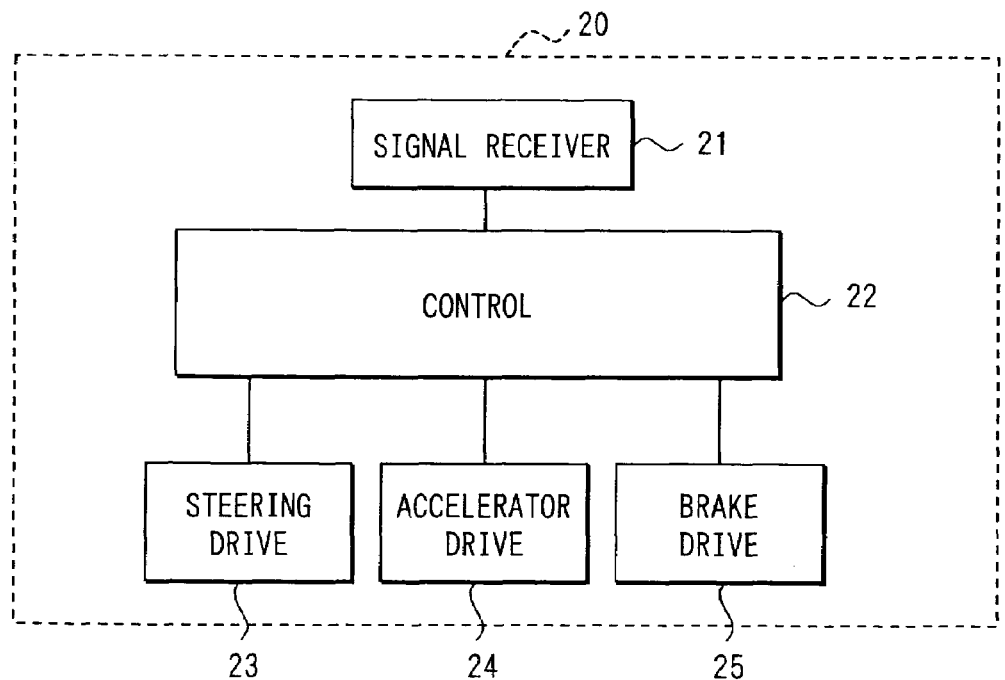
FIG. 3 is a schematic block diagram showing overall structure of an automatic travel guiding device mounted in a vehicle.

The vehicle having the car navigation system is provided with an automatic travel guiding device 20 for enabling the vehicle to automatically travel on an automatic travel road, as shown in FIG. 3. Here, the automatic travel road has, for each lane of the road, buried lane signal transmitters such as magnetic nails (not shown) at given distance intervals. The automatic travel guiding device 20 includes a signal receiver 21 that receives signals from the signal transmitter. The signal receiver 21 is disposed approximately at a center of a vehicle width to detect relative displacement to the signal transmitter that is approximately located at a center of a lane width. A control unit 22 controls a steering drive unit 23, an accelerator drive unit 24, or a brake drive unit 25 based on a result of detection for enabling the vehicle to travel along a center line of the lane.

The above automatic travel guiding device 20 is only an instance, so that other types of the automatic travel guiding device can be used. The device can perform automatic travel by obtaining information such as shapes of the road or a speed limit that is obtained from a roadside using a communication means other than the buried signal transmitters. The device can furthermore perform automatic travel in linkage with the preceding vehicle or in following the preceding vehicle.

A feature of the embodiment, route search processing for searching for a travel route from a starting point to a destination will be explained with reference to FIGS. 2A, 2B, 4, 5.

Figure 4:
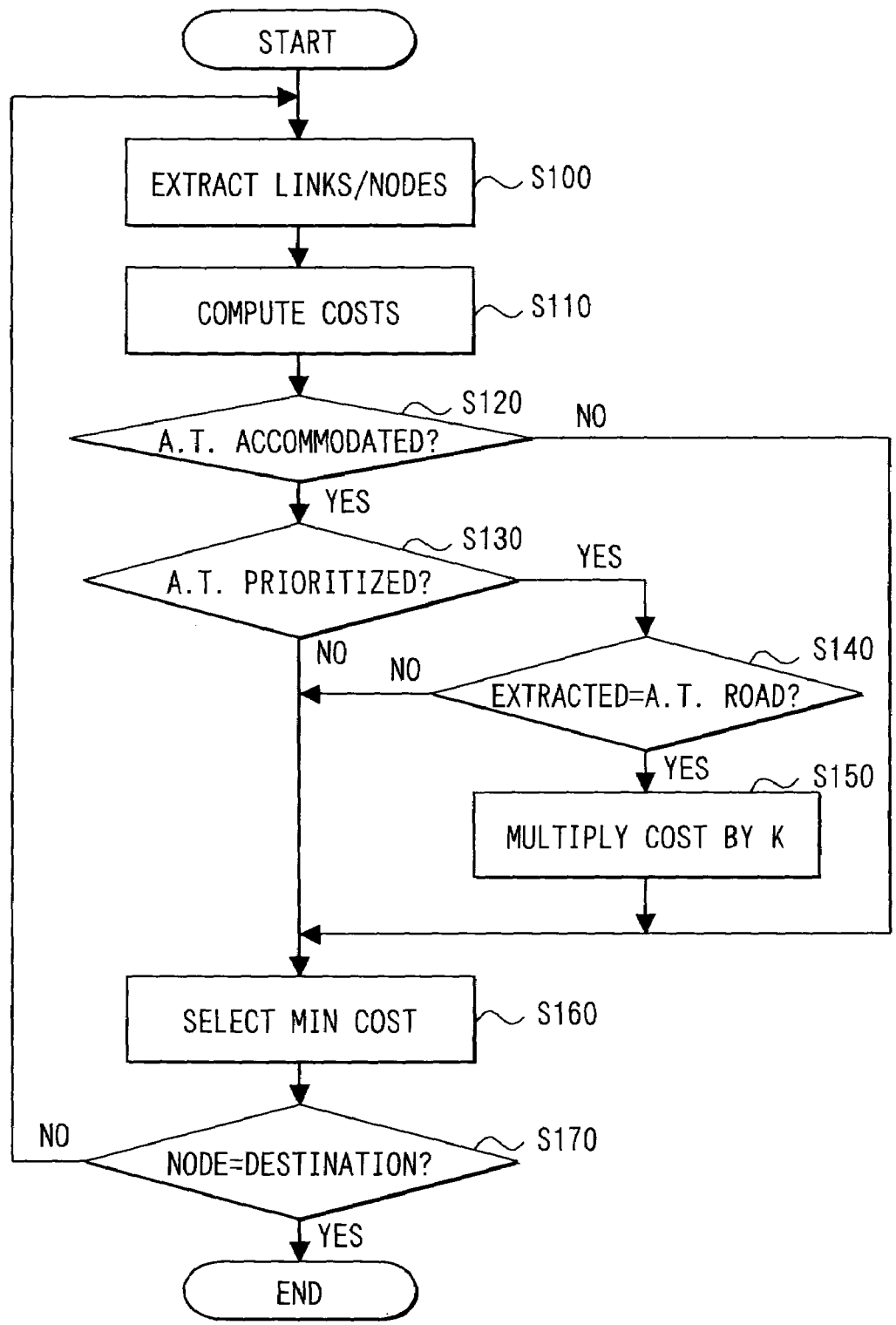
FIG. 4 is a flowchart diagram explaining route search processing in the car navigation system.

When a destination is inputted through the manipulation switch group 7 or speech recognition unit 13, search route processing is executed as shown in FIG. 4.

Figure 2B:
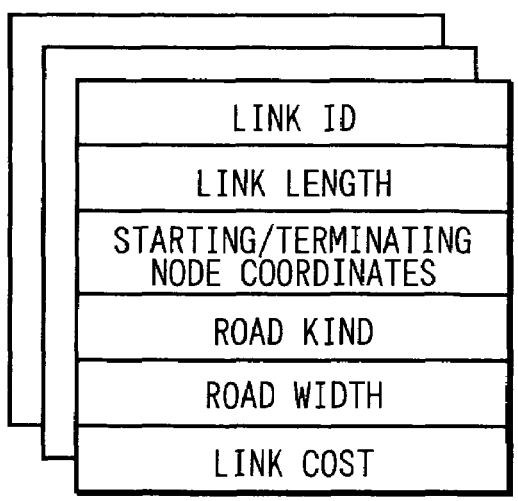
FIG. 2B is a diagram explaining structure of link data.

At Step 100, nodes and links for route search from the present position of the vehicle as the starting point to the destination are extracted based on the node data and link data shown in FIGS. 2A, 2B. A user can change the starting point from the present position to somewhere through manipulating the manipulation switch group 7.

Here, extracting of the nodes and links will be explained. The embodiment uses known Dijkstra method or the like for extracting. The link data has coordinates of the starting and terminating nodes of each link as shown in FIG. 2B. Accordingly, based on the coordinates of the starting point, with referring to the coordinates of the node, it can be determined whether the link is near the starting point. Furthermore, with referring to the connection link IDs of the node data, relation of connection of the links can be specified. Accordingly, a road that are constituted by the plural links around the starting point can be designated by designating links that have connection relationship with the links around the starting points with referring to the connection link IDs of the node data. Thus, each time a given node and corresponding link are tracked, a route having the minimum cost for reaching the given node is computed. As a certain node and corresponding link are then newly tracked via the given node, a route having the minimum cost for reaching the certain node is also computed. Hereafter, the above computing is repeated till a node that is newly tracked corresponds to the destination, so that a route having the minimum cost from the starting point to the destination can be designated.

However, if all the nodes and links between the starting point and the destination were treated in the above computing, a computation volume would become vast. Practical processing is thereby efficiently executed by lessening targeted nodes and links with considering a direction from the starting point to the destination or hierarchy of the node data or link data.

Here, the cost of the link is assigned based on the length of the link, the kind of the road, an averaged travel speed, or the like. The connection relation of links can be also added as a cost. Namely, it is more difficult for the vehicle to travel through two links that are connected with each other via a right-turn or left-turn corner than through two links that are directly connected. Therefore, when two links are connected via a turn corner, a cost based on the turn corner can be assigned to node data so that easiness of traveling can be considered.

At Step 110, a cost is computed for each of routes constituted by the extracted links and nodes. At Step 120, it is determined whether the vehicle is accommodated to automatic travel (A.T.). Namely, it is determined whether the vehicle is provided with the automatic travel guiding device 20 shown in FIG. 3. To determine it, in a vehicle having an in-vehicle local network, the navigation ECU 8 can ask the automatic travel guiding device 20 or store data indicating installing of the automatic travel guiding device 20 when the automatic travel guiding device 20 is installed.

When it is determined that the vehicle is accommodated to the automatic travel at Step 120, it is determined at Step 130 whether it is commanded that the automatic travel road be given priority to in the route search from the starting point to the destination. In the car navigation system of the embodiment, "local road priority" "toll road priority," or "automatic travel priority" can be selected. When "automatic travel priority" is selected, it is determined to be "YES" at Step 130. The processing proceeds to Step 140, where it is determined whether the extracted links and nodes correspond to an automatic travel road (A.T. ROAD). The links that correspond to the automatic travel road have "automatic travel road" in the road kind of the link data. This makes it possible to determine whether the link corresponds to the automatic travel road. Furthermore, the latest data regarding the links and nodes that correspond to the automatic travel can be obtained from the external information I/O unit 11, so that the determination can be done.

When it is determined that the extracted links and nodes correspond to the automatic travel road at Step 140, the processing proceeds to Step 150. Here, a cost of a route corresponding to the automatic travel road is lessened. Namely, a present cost, as a total of link costs, of the route corresponding to the automatic travel road is multiplied by a coefficient K of less than one, so that the cost of the automatic travel road is lessened.

At Step 160, a given route having the minimum cost to a given search node is selected based on costs of the links and nodes that constitute the given route. When it is determined that the vehicle is not accommodated to the automatic travel at Step 120 or when it is determined that it is not commanded that the automatic travel road be given priority to, the processing proceeds to Step 160 without executing processing at Steps 140, 150.

At Step 170, it is determined whether the given search node corresponds to the destination. When it is determined that the given search node corresponds to the destination, the given route having the minimum cost is selected and the route search processing is thereby terminated. By contrast, when the given search node does not correspond to the destination, the processing repeats the processing from Step 100.

Figure 5A:
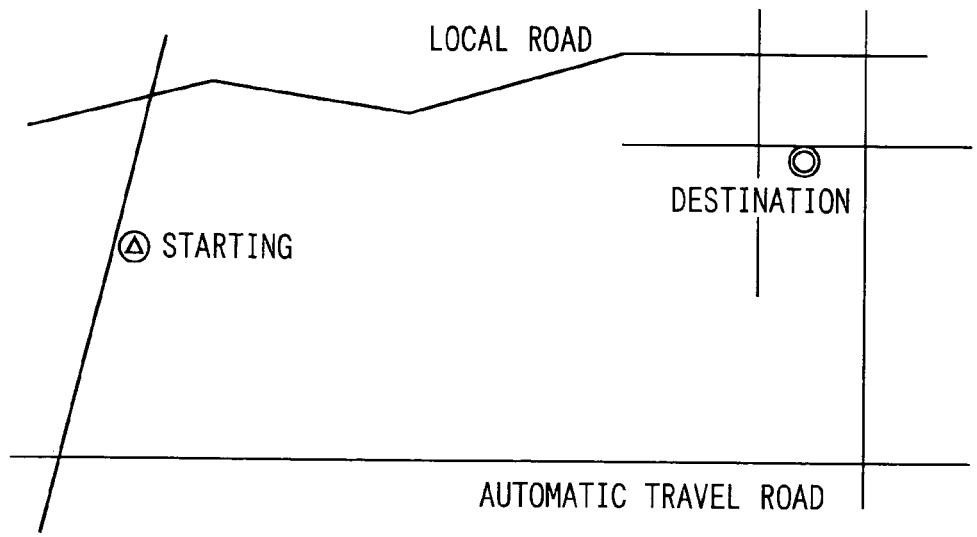
FIGS. 5A, 5B are diagrams showing instances of selecting a route from a starting point to a destination.
Figure 5B:
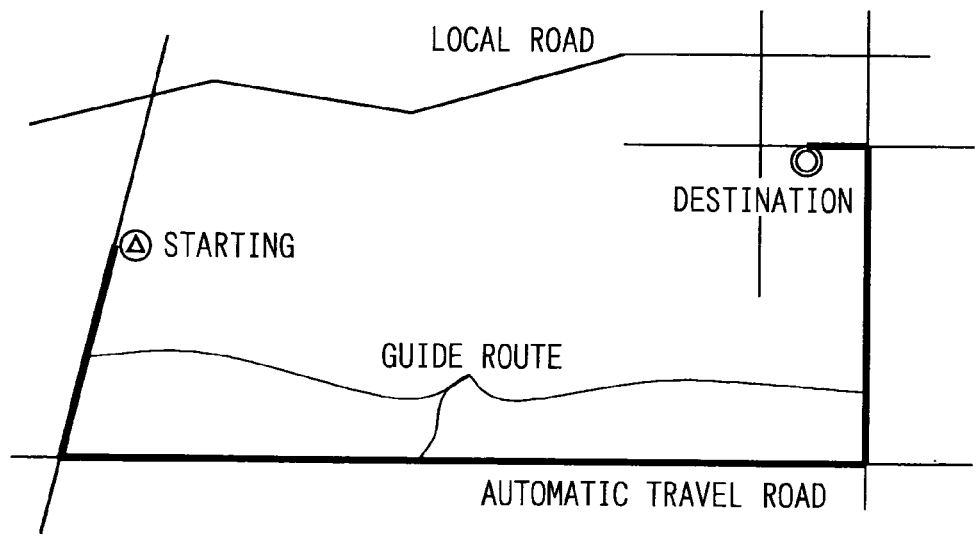

FIGS. 5A, 5B show instances that follow the above route search processing. As shown in FIG. 5A, only when a starting point and a destination are set, a route using only local roads has the shortest distance and its cost becomes the lower than a route using an automatic travel road. It means that no capability of preferentially selecting an automatic travel road results in designating a route passing only through the local roads.

However, according to the car navigation system of the embodiment, capability of preferentially selecting the automatic travel road enables a route including the automatic travel road to be preferentially selected as the minimum cost. Here, preferential selecting of the automatic travel road is equivalent to making costs of the links constituting the automatic travel road lower than that before the automatic travel road is given priority to.

It will be obvious to those skilled in the art that various changes may be made in the above-described embodiments of the present invention. However, the scope of the present invention should be determined by the following claims.

What is claimed is:

1. A car navigation system comprising:
   road map data including node data indicating at least one point of a branch point, a junction point, and an intersection point, and link data indicating a road between the points;
   a route searching unit for searching for a route between two points based on the road map data;
   a notifying unit for notifying the route that is searched for as a guide route of the two points;
   a commanding unit for commanding that the route searching unit select a route as giving priority to an automatic travel road where a vehicle can automatically travel; and
   a determining unit for determining whether a vehicle where the car navigation system is mounted has an automatic travel guiding device,
   wherein, when the route searching unit is commanded to select a route as giving priority to the automatic travel road, the route searching unit preferentially selects a route including a road that corresponds to the automatic travel road,
   wherein, only when the determining unit determines that the vehicle has the automatic travel guiding device, the route searching unit selects a route as giving priority to the automatic travel road.

2. A car navigation system for a car with an automatic travel guiding device that is used for automatic travel, the car navigation system comprising:
   road map data including node data indicating at least one point of a branch point, a junction point, and an intersection point, and link data indicating a road between the points;
   a route searching unit for searching for a route between two points based on the road map data;
   a notifying unit for notifying the route that is searched for as a guide route of the two points; and
   a commanding unit for commanding that the route searching unit select a route as giving priority to an automatic travel road where a vehicle can automatically travel,
   wherein, when the route searching unit is commanded to select a route as giving priority to the automatic travel road, the route searching unit preferentially selects a route including a road that corresponds to the automatic travel road.

3. The car navigation system according to claim 2,
wherein the link data of the road map data includes a cost,
wherein the route searching unit selects a given route where a total of costs of links that are included in the given route is a minimum value, and
wherein, when the route searching unit is commanded to select a route as giving priority to the automatic travel road, a cost of link data that corresponds to the automatic travel road is changed to be smaller.

4. A car navigation system comprising:
road map data including node data indicating at least one point of a branch point, a junction point, and an intersection point, and link data indicating a road between the points;
a route searching unit for searching for a route between two points based on the road map data;
a notifying unit for notifying the route that is searched for as a guide route of the two points;
a commanding unit for commanding that the route searching unit select a route as giving priority to an automatic travel road where a vehicle can automatically travel; and
a determining unit for determining whether a vehicle where the car navigation system is mounted has an automatic travel guiding device,
wherein, when the route searching unit is commanded to select a route as giving priority to the automatic travel road, the route searching unit preferentially selects a route including a road that corresponds to the automatic travel road,
wherein, after the determining unit determines that the vehicle has the automatic travel guiding device, the route searching unit selects a route as giving priority to the automatic travel road.

5. A route searching method used in a car navigation system provided with an automatic travel guiding device that is used for automatic travel, wherein the car navigation system has road map data that includes node data indicating at least one point of a branch point, a junction point, and an intersection point and link data indicating a road between the points, the route searching method comprising steps of:
searching for a route between two points based on the road map data;
notifying the route that is searched for as a guide route of the two points; and
commanding that the route be selected as giving priority to an automatic travel road where a vehicle can automatically travel,
wherein, when it is commanded that a route be selected as giving priority to the automatic travel road, a route including a road that corresponds to the automatic travel road is preferentially selected.

6. A car navigation system comprising:
road map data including node data indicating at least one point of a branch point, a junction point, and an intersection point, and link data indicating a road between the points;
a route searching unit for searching for a route between two points based on the road map data;
a notifying unit for notifying the route that is searched for as a guide route of the two points;
a commanding unit for commanding that the route searching unit select a route as giving priority to an automatic travel road where a vehicle can automatically travel; and
an automatic travel guiding device that is used for automatic travel, responsive to the route,
wherein, when the route searching unit is commanded to select a route as giving priority to the automatic travel road, the route searching unit preferentially selects a route including a road that corresponds to the automatic travel road.

7. A route searching method used in a car navigation having road map data that includes node data indicating at least one point of a branch point, a junction point, and an intersection point and link data indicating a road between the points, the route searching method comprising steps of:
searching for a route between two points based on the road map data;
notifying the route that is searched for as a guide route of the two points;
commanding that the route be selected as giving priority to an automatic travel road where a vehicle can automatically travel; and
providing the route to an automatic travel guiding device that is used for automatic travel,
wherein, when it is commanded that a route be selected as giving priority to the automatic travel road, a route including a road that corresponds to the automatic travel road is preferentially selected.

8. A route searching method used in a car navigation having road map data that includes node data indicating at least one point of a branch point, a junction point, and an intersection point and link data indicating a road between the points, the route searching method comprising steps of:
searching for a route between two points based on the road map data;
notifying the route that is searched for as a guide route of the two points;
commanding that the route be selected as giving priority to an automatic travel road where a vehicle can automatically travel; and
determining whether a vehicle where the car navigation system is mounted has an automatic travel guiding device, wherein the commanding is responsive to the determining that the vehicle has the automatic travel guiding device,
wherein, when it is commanded that a route be selected as giving priority to the automatic travel road, a route including a road that corresponds to the automatic travel road is preferentially selected.

* * * * *